United States Patent
Cox

(10) Patent No.: US 9,321,053 B2
(45) Date of Patent: *Apr. 26, 2016

(54) VERTICAL CLAMP DEVICE

(71) Applicant: LIFE TECHNOLOGIES CORPORATION, Carlsbad, CA (US)

(72) Inventor: David M. Cox, Foster City, CA (US)

(73) Assignee: Life Technologies Corporation, Carlsbad, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/810,018

(22) Filed: Jul. 27, 2015

(65) Prior Publication Data

US 2015/0328640 A1 Nov. 19, 2015

Related U.S. Application Data

(63) Continuation of application No. 14/558,321, filed on Dec. 2, 2014, now Pat. No. 9,120,097, which is a continuation of application No. 14/015,880, filed on Aug. 30, 2013, now Pat. No. 8,925,397.

(60) Provisional application No. 61/694,807, filed on Aug. 30, 2012.

(51) Int. Cl.
*B01L 3/00* (2006.01)
*B01L 9/00* (2006.01)
*F16M 13/02* (2006.01)

(52) U.S. Cl.
CPC . *B01L 9/52* (2013.01); *B01L 9/527* (2013.01); *F16M 13/02* (2013.01); *B01L 3/502715* (2013.01); *B01L 2200/025* (2013.01); *B01L 2200/12* (2013.01); *B01L 2300/0609* (2013.01); *B01L 2300/0645* (2013.01); *B01L 2300/0816* (2013.01); *Y10S 439/912* (2013.01); *Y10T 137/0402* (2015.04); *Y10T 137/598* (2015.04); *Y10T 137/6966* (2015.04)

(58) Field of Classification Search
None
See application file for complete search history.

(56) References Cited

U.S. PATENT DOCUMENTS

| 5,718,816 A | 2/1998 | Savage et al. |
| 6,114,122 A | 9/2000 | Besemer |
| 6,193,864 B1 | 2/2001 | Leader et al. |

(Continued)

FOREIGN PATENT DOCUMENTS

| EP | 1324828 | 7/2003 |
| EP | 1327141 | 7/2003 |

(Continued)

OTHER PUBLICATIONS

International Preliminary Report on Patentability for International Application No. PCT/US2013/057716 mailed Mar. 3, 2015, 8 pages.

(Continued)

*Primary Examiner* — Bradley Duckworth

(57) ABSTRACT

A vertical clamping device is provided that supports a flow cell component in a vertical configuration in which the flow cell is on an opposite side of the vertical support from the electronic interface. The clamp includes a vertical setting to receive the flow cell component and provides an electronic interface on a vertical surface of the vertical setting. A block supports the fluidics interface and can move in a horizontal direction bringing the fluidics interface into contact with the flow cell component.

20 Claims, 13 Drawing Sheets

(56) References Cited

U.S. PATENT DOCUMENTS

| | | |
|---|---|---|
| 6,391,623 B1 | 5/2002 | Besemer |
| 6,443,179 B1 | 9/2002 | Benavides et al. |
| 6,934,836 B2 | 8/2005 | Strand et al. |
| 7,172,897 B2 | 2/2007 | Blackburn et al. |
| 7,312,087 B2 | 12/2007 | Duong et al. |
| 7,675,624 B2 | 3/2010 | Chinowsky et al. |
| 7,863,035 B2 | 1/2011 | Clemmens et al. |
| 7,871,575 B2 | 1/2011 | Baeuerle et al. |
| 8,105,783 B2 | 1/2012 | Handique |
| 8,133,671 B2 | 3/2012 | Williams et al. |
| 8,153,059 B2 | 4/2012 | Trieu et al. |
| 8,174,700 B2 | 5/2012 | Chinowsky et al. |
| 8,323,900 B2 | 12/2012 | Handique et al. |
| 8,354,059 B2 | 1/2013 | Miyamura et al. |
| 8,354,080 B2 | 1/2013 | Tsao et al. |
| 8,394,341 B2 | 3/2013 | Reinhardt et al. |
| 8,398,418 B2 | 3/2013 | Nobile et al. |
| 8,404,198 B2 | 3/2013 | Amshey et al. |
| 8,753,586 B2 | 6/2014 | Prentice et al. |
| 8,845,984 B2 | 9/2014 | Amshey et al. |
| 8,871,156 B2 | 10/2014 | Tsao et al. |
| 2002/0155033 A1 | 10/2002 | Strand et al. |
| 2002/0176804 A1 | 11/2002 | Strand et al. |
| 2002/0177135 A1 | 11/2002 | Doung et al. |
| 2013/0309778 A1 | 11/2003 | Lowe et al. |
| 2004/0053290 A1 | 3/2004 | Terbrueggen et al. |
| 2004/0163970 A1 | 8/2004 | Sin et al. |
| 2005/0191212 A1 | 9/2005 | Antocci et al. |
| 2006/0057245 A1 | 3/2006 | Haupt et al. |
| 2006/0063178 A1 | 3/2006 | Rauh-Adelmann et al. |
| 2007/0098600 A1 | 5/2007 | Kayyem |
| 2007/0122314 A1 | 5/2007 | Strand et al. |
| 2007/0292941 A1 | 12/2007 | Handique |
| 2008/0202927 A1 | 8/2008 | Kayyem et al. |
| 2008/0242553 A1 | 10/2008 | Kayyem |
| 2009/0057147 A1 | 3/2009 | Kayyem et al. |
| 2009/0114044 A1 | 5/2009 | Godfrey et al. |
| 2009/0221059 A1 | 9/2009 | Williams et al. |
| 2009/0291507 A1 | 11/2009 | Clemmens et al. |
| 2010/0028984 A1 | 2/2010 | Duong et al. |
| 2010/0239462 A1 | 9/2010 | Van't Oever et al. |
| 2010/0284012 A1 | 11/2010 | Chinowsky et al. |
| 2010/0285981 A1 | 11/2010 | Kayyem |
| 2010/0320748 A1 | 12/2010 | Van't Oever et al. |
| 2011/0100100 A1 | 5/2011 | Strand et al. |
| 2011/0180425 A1 | 7/2011 | Kayyem |
| 2011/0217860 A1 | 9/2011 | Nobile et al. |
| 2012/0024399 A1 | 2/2012 | Prentice et al. |
| 2012/0143531 A1 | 6/2012 | Davey et al. |
| 2012/0152740 A1 | 6/2012 | Kim et al. |
| 2012/0171759 A1 | 7/2012 | Williams et al. |
| 2013/0101990 A1 | 4/2013 | Handique |
| 2013/0137591 A1 | 5/2013 | Clemmens et al. |
| 2013/0209326 A1 | 8/2013 | Williams et al. |
| 2013/0210125 A1 | 8/2013 | Williams et al. |
| 2013/0210126 A1 | 8/2013 | Williams et al. |
| 2013/0210127 A1 | 8/2013 | Williams et al. |
| 2013/0210682 A1 | 8/2013 | Eltoukhy et al. |
| 2013/0288358 A1 | 10/2013 | Handique |
| 2014/0047907 A1 | 2/2014 | Murphy et al. |
| 2014/0227146 A1 | 8/2014 | Kusner et al. |
| 2014/0319042 A1 | 10/2014 | Prentice et al. |
| 2015/0044758 A1 | 2/2015 | Amshey et al. |

FOREIGN PATENT DOCUMENTS

| | | |
|---|---|---|
| EP | 1328346 | 7/2003 |
| EP | 1331999 | 8/2003 |
| EP | 1391241 | 2/2004 |
| EP | 0914609 | 7/2005 |
| EP | 1585594 | 10/2005 |
| EP | 1246699 | 1/2007 |
| EP | 1872110 | 1/2008 |
| EP | 2001990 | 12/2008 |
| EP | 2063987 | 6/2009 |
| EP | 2091647 | 8/2009 |
| EP | 1919623 | 12/2009 |
| EP | 2179025 | 4/2010 |
| EP | 1715348 | 2/2011 |
| EP | 2331954 | 6/2011 |
| EP | 2403621 | 1/2012 |
| EP | 2403646 | 1/2012 |
| EP | 2442092 | 4/2012 |
| EP | 2613881 | 7/2013 |
| EP | 2632593 | 9/2013 |
| EP | 2701844 | 3/2014 |
| EP | 1577012 | 11/2014 |
| EP | 2814942 | 12/2014 |
| WO | 9743639 | 11/1997 |
| WO | 0026654 | 5/2000 |
| WO | 0154813 | 8/2001 |
| WO | 0228509 | 4/2002 |
| WO | 0228531 | 4/2002 |
| WO | 0228532 | 4/2002 |
| WO | 0243864 | 6/2002 |
| WO | 2004052541 | 6/2004 |
| WO | 2004074813 | 9/2004 |
| WO | 2005084808 | 9/2005 |
| WO | 2006103440 | 10/2006 |
| WO | 2006113177 | 10/2006 |
| WO | 2007016931 | 2/2007 |
| WO | 2007112114 | 10/2007 |
| WO | 2008030088 | 3/2008 |
| WO | 2008060604 | 5/2008 |
| WO | 2008101196 | 8/2008 |
| WO | 2009054870 | 4/2009 |
| WO | 2010025302 | 3/2010 |
| WO | 2010102194 | 9/2010 |
| WO | 2010102199 | 9/2010 |
| WO | 2010118427 | 10/2010 |
| WO | 2012032294 | 3/2012 |
| WO | 2012058096 | 5/2012 |
| WO | 2012148699 | 11/2012 |
| WO | 2013122995 | 8/2013 |
| WO | 2013123035 | 8/2013 |

OTHER PUBLICATIONS

International Search Report of the International Searching Authority and Written Opinion for International Application No. PCT/US2013/057716 mailed Dec. 5, 2013, 13 pages.

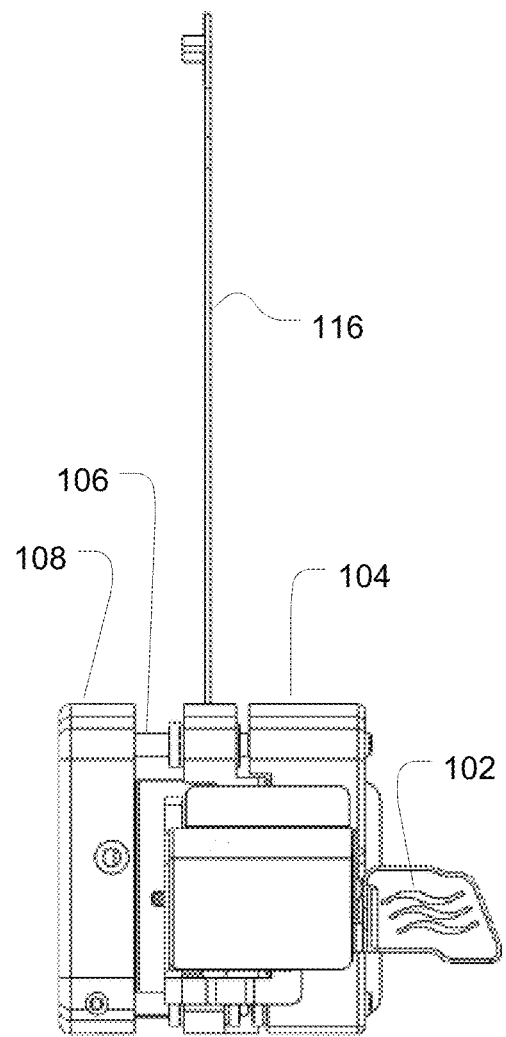
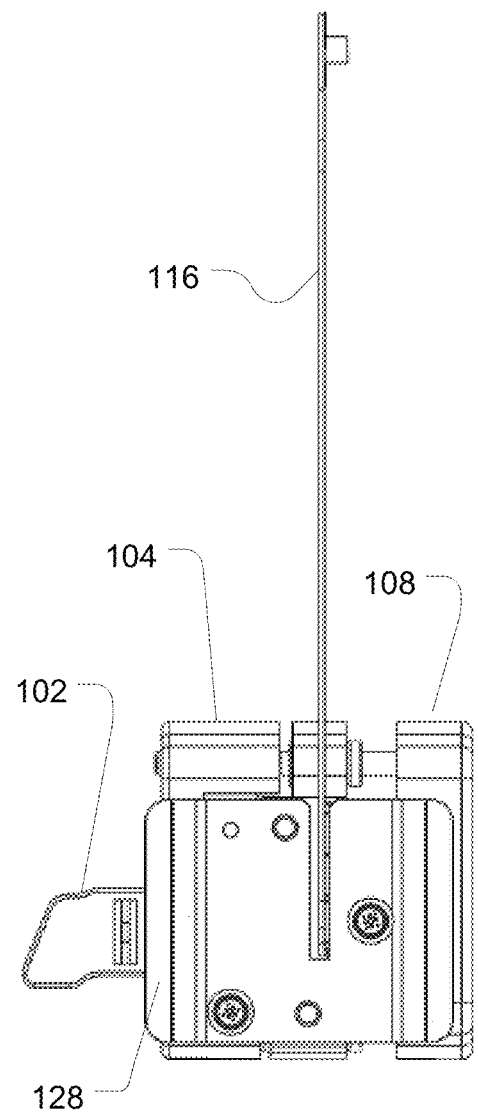

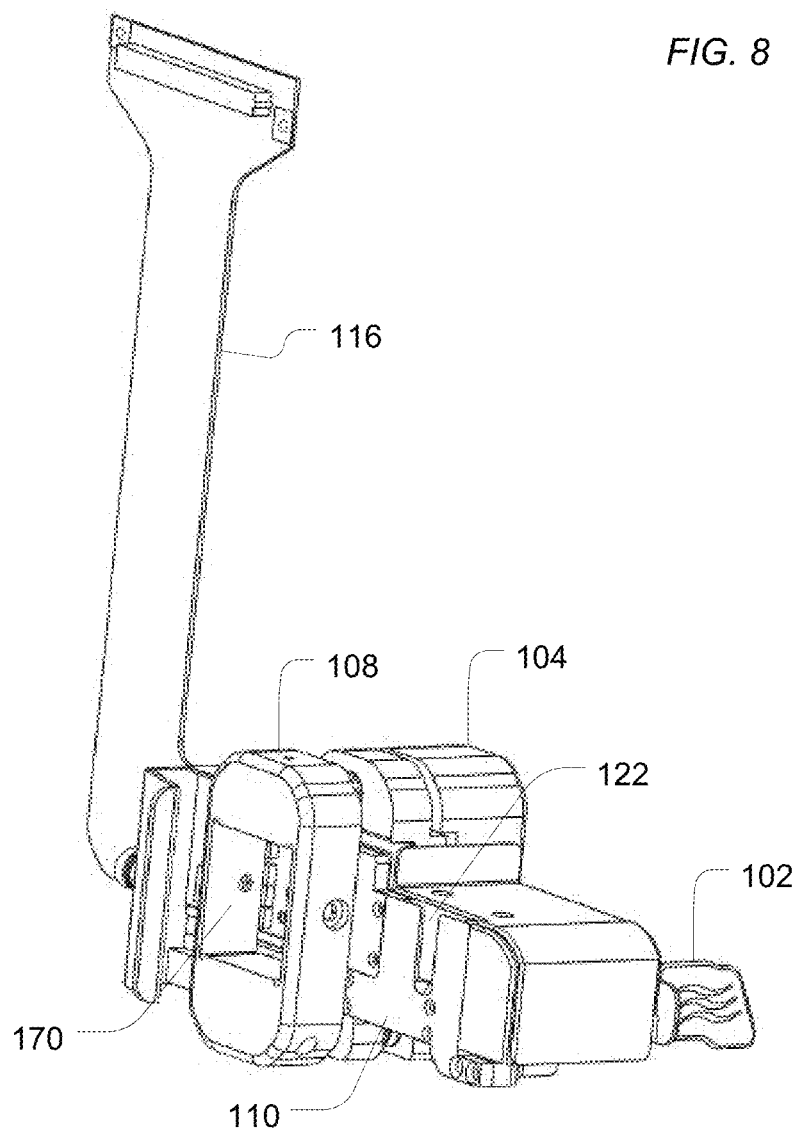

VERTICAL CLAMP DEVICE

CROSS-REFERENCE TO RELATED APPLICATIONS

This application is a continuation of U.S. application Ser. No. 14/558,321, filed Dec. 2, 2014, and entitled "Vertical Clamp Device," which is a continuation of U.S. application Ser. No. 14/015,880, filed Aug. 30, 2013, and entitled "Vertical Clamp Device," which claims priority to U.S. application Ser. No. 61/694,807, filed Aug. 30, 2012, each of which is incorporated herein by reference in its entirety.

FIELD OF THE DISCLOSURE

This disclosure, in general, relates to clamp devices for interfacing with flow cell sensors.

BACKGROUND

Increasingly, devices are integrating sensors within flow cell designs. Such flow cell designs can guide fluid including an analyte over sensors, such as an array of sensors, to detect the analyte or to detect a reaction incorporating the analyte. When such devices include both an electronic interface and a fluid interface, there is a significant risk of short-circuiting or damaging the electronic interface when fluid drips onto the electronic interface.

Such risk is particularly high when engaging or disengaging the fluid interface. Moreover, when the interface is not engaged, any fluid contacting the electronic interface can significant damage the electronic interface.

As such, an improved clamping device would be desirable.

SUMMARY

In an exemplary embodiment, a vertical clamping device is provided that supports a flow cell component in a vertical configuration in which the flow cell is on an opposite side of the vertical support from the electronic interface. The clamp includes a vertical setting to receive the flow cell component and provides an electronic interface on a vertical surface of the vertical setting. A block supports the fluidics interface and can move in a horizontal direction bringing the fluidics interface into contact with the flow cell component.

BRIEF DESCRIPTION OF THE DRAWINGS

The present disclosure may be better understood, and its numerous features and advantages made apparent to those skilled in the art by referencing the accompanying drawings.

FIG. 6 and FIG. 7 include side view illustrations of an exemplary vertical clamping device.

FIG. 8 includes an isometric illustration of an exemplary vertical clamping device.

The use of the same reference symbols in different drawings indicates similar or identical items.

DETAILED DESCRIPTION

In an exemplary embodiment, a vertical clamping device is provided that supports a flow cell component in a vertical configuration in which the flow cell is on an opposite side of the vertical support from the electronic interface. The clamp includes a vertical setting to receive the flow cell component and provides an electronic interface on a vertical surface of the vertical setting. A block supports the fluidics interface and can move in a horizontal direction bringing the fluidics interface into contact with the flow cell component.

Figure 1:
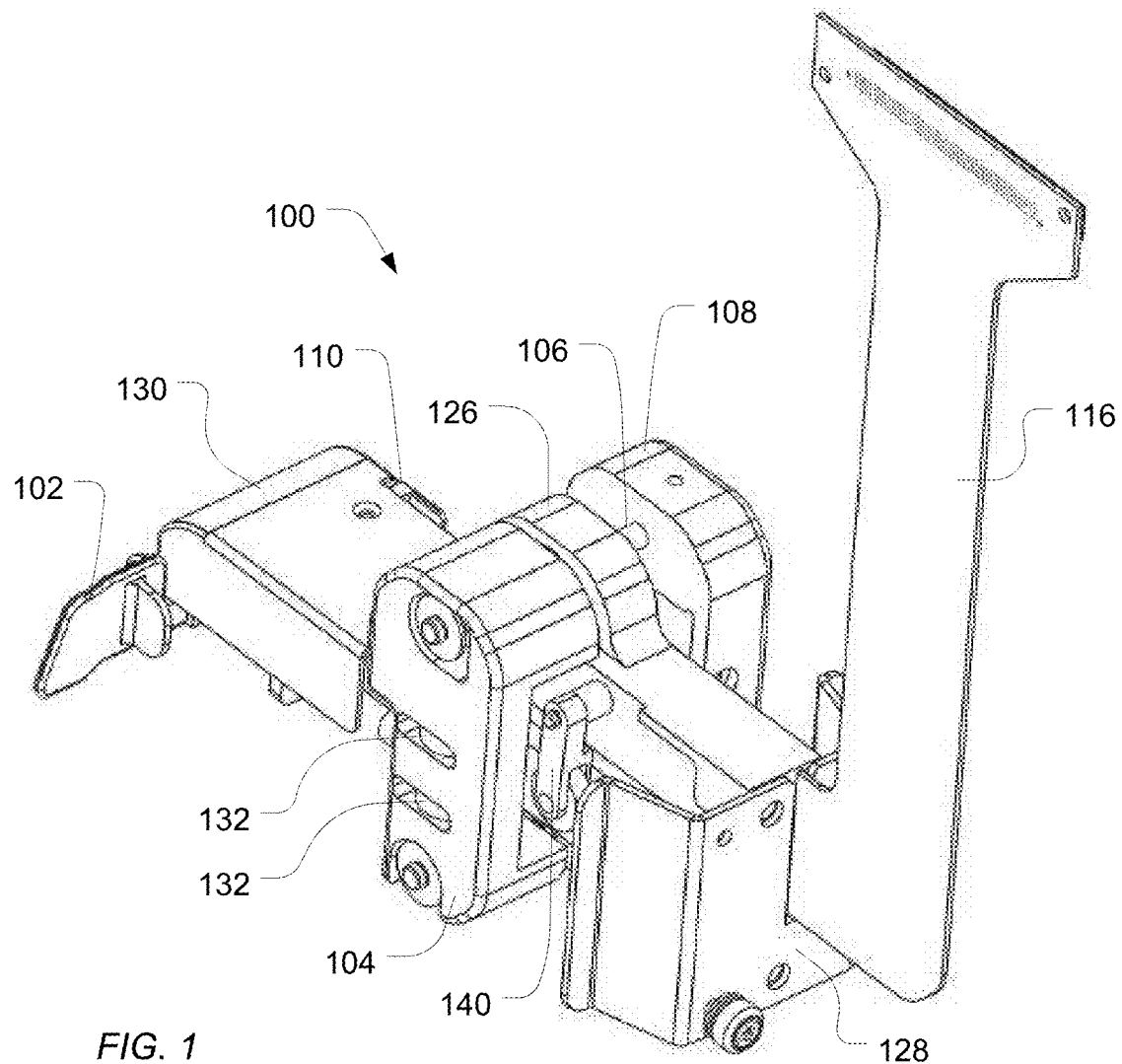
FIG. 1 includes an isometric illustration of an exemplary vertical clamping device.
Figure 2:
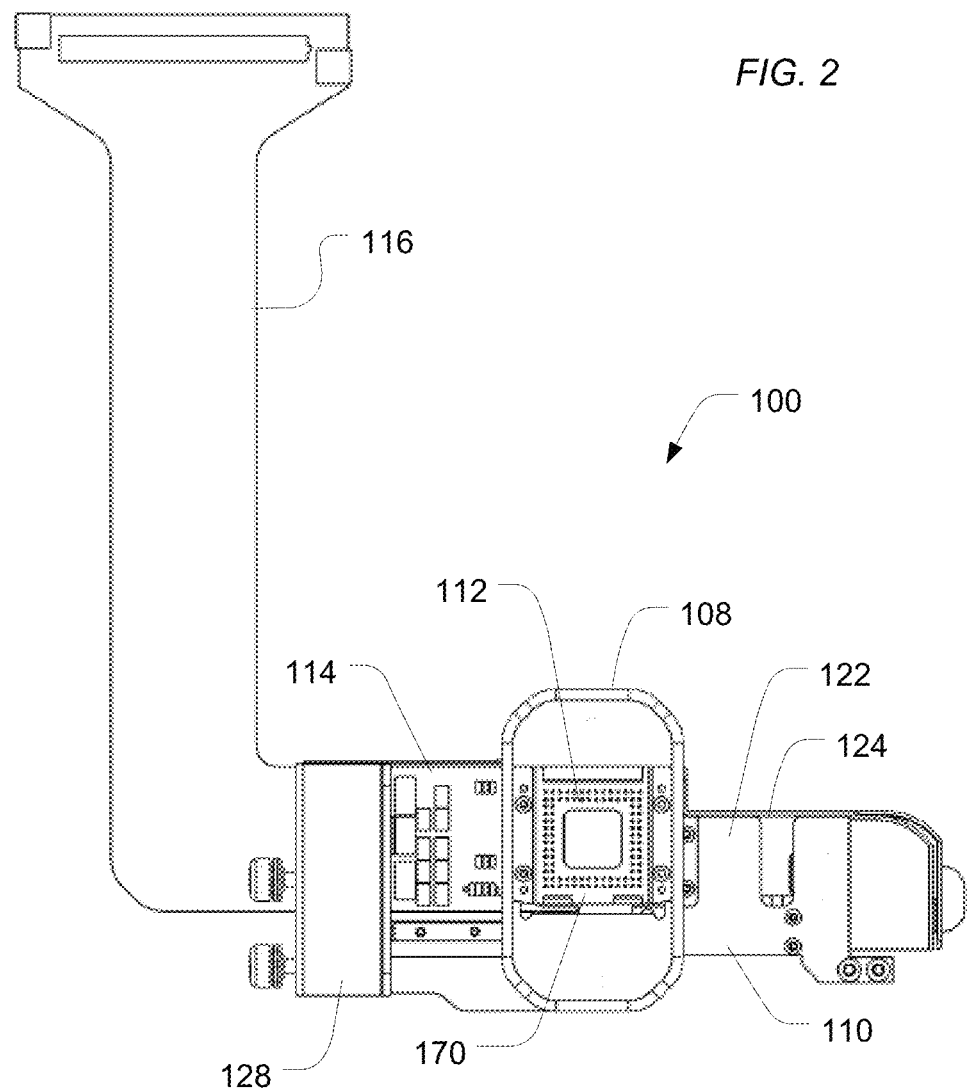
FIG. 2 and FIG. 3 include side view illustrations of an exemplary vertical clamping device.
Figure 3:
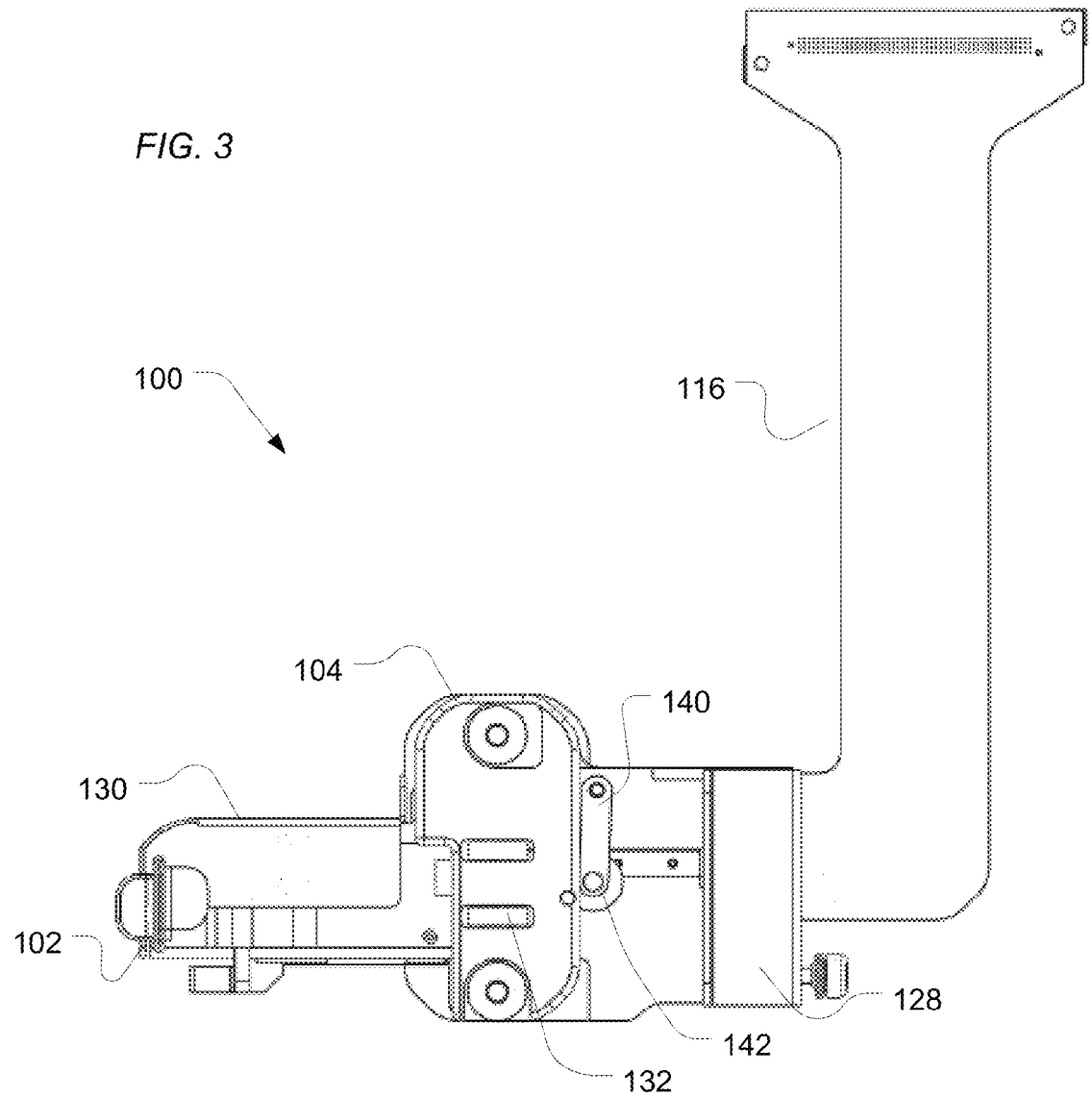
Figure 4:
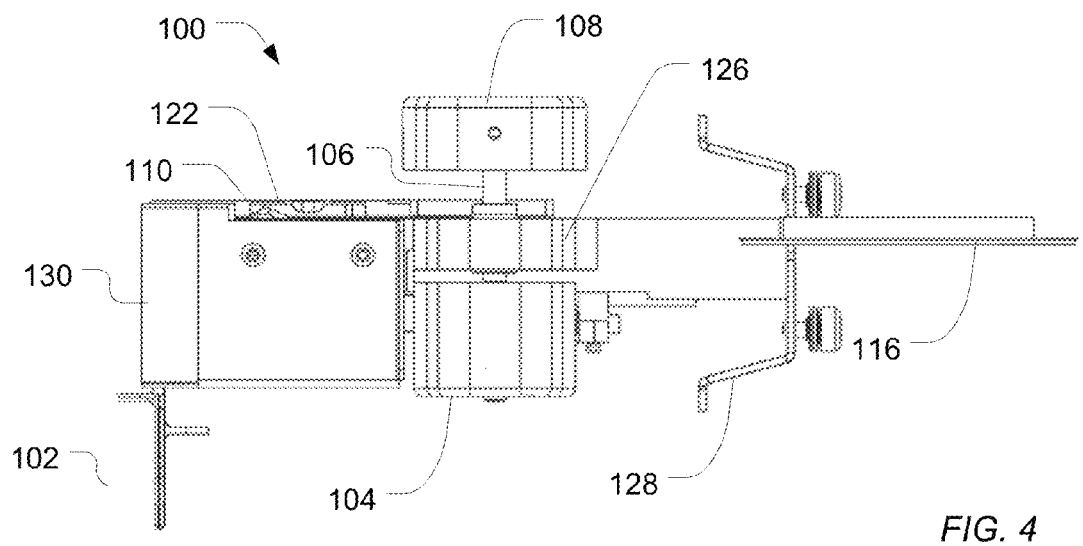
FIG. 4 includes a top view illustration of an exemplary vertical clamp device.
Figure 5:
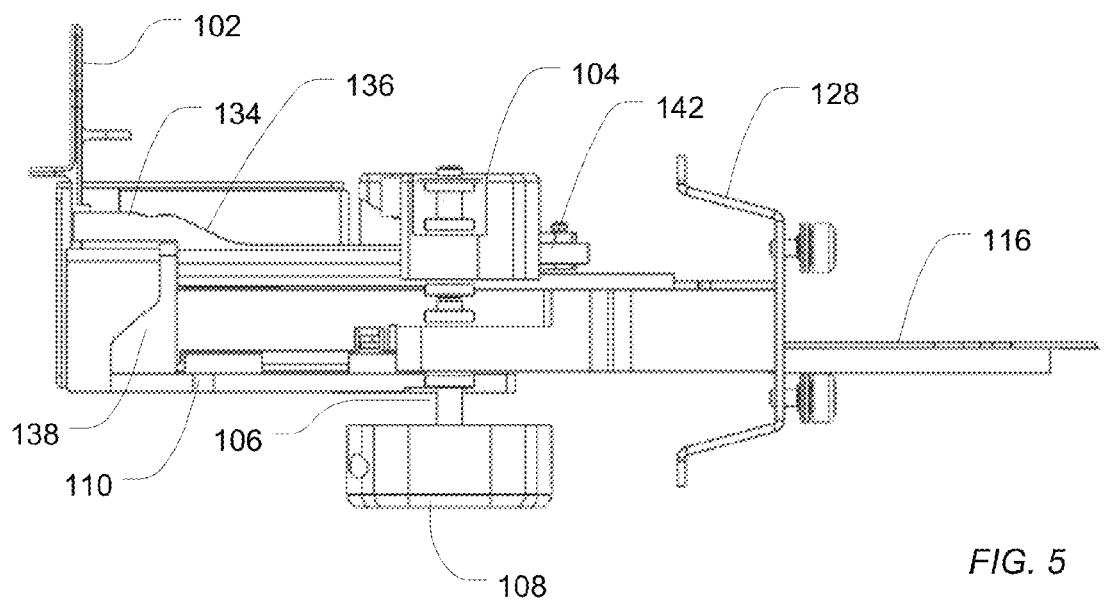
FIG. 5 includes a bottom view illustration of an exemplary vertical clamping device.
Figure 19:
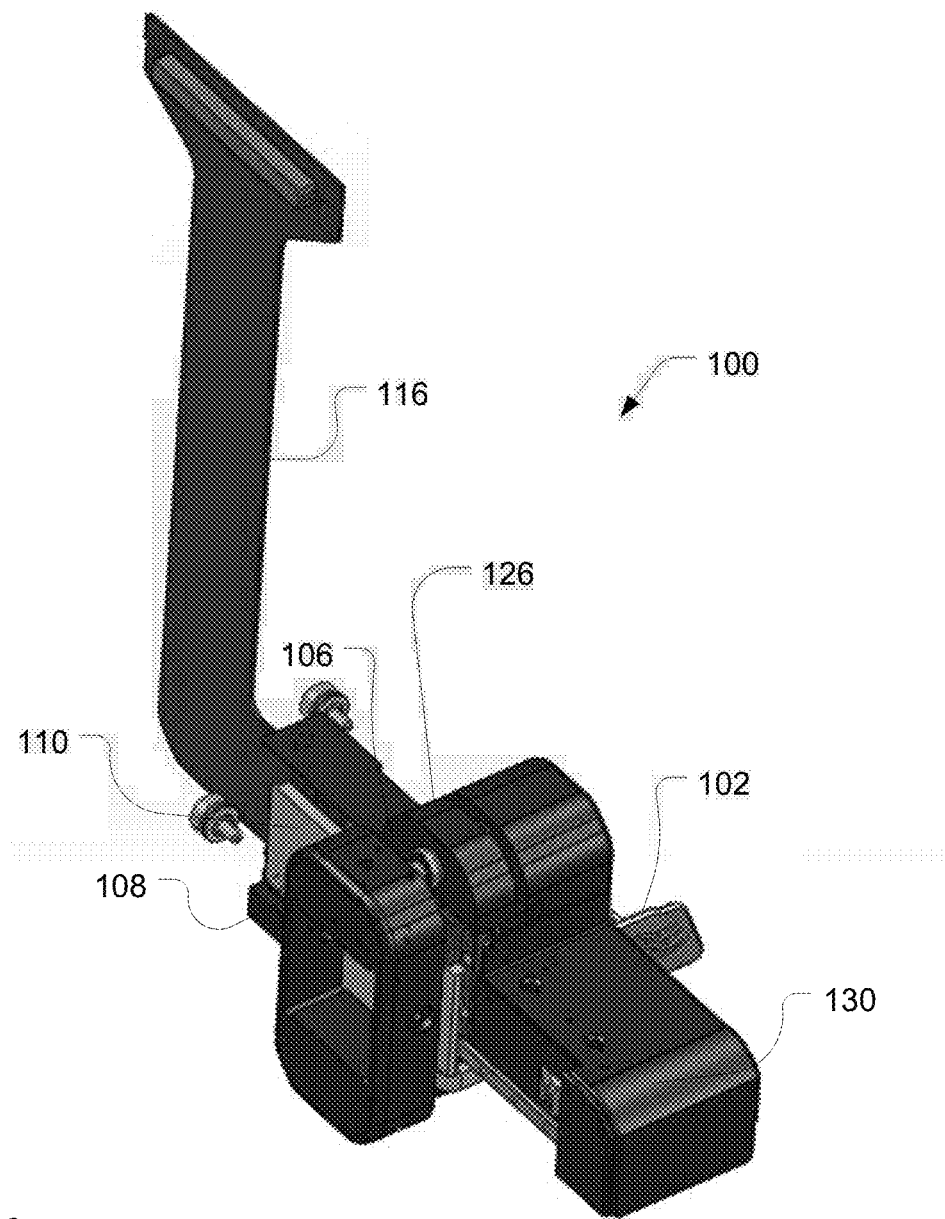
FIG. 19 includes an illustration of the exemplary vertical clamping mechanism in a closed position.

In FIGS. 1-17, a vertical clamping device 100 is illustrated in an open position or insert position. FIG. 19 illustrates the vertical clamping device 100 in a closed position. The vertical clamping device has an intermediate engage position, described below. In the insert or open position, a flow cell component can be inserted into the vertical clamp in a vertical orientation. The vertical clamping device 100 includes a handle 102. When a user engages the handle 102 and pushes the handle 102 from its illustrated front position, towards a guide block 104, a slide or drive component engages the guide block 104 moving the guide block 104 away from a support 126. The guide block 104 is attached to a fluidics interface block 108 by rods 106, which are supported by the support 126. As the guide block 104 is motivated away from the support 126, the rods 106 motivate the fluidics interface block 108 toward the support 126. In addition, as handle 102 moves forward, a carriage 110, which includes a receptacle 122, as illustrated in FIG. 2, is allowed to move a flow cell component within the receptacle 122 towards an electronic interface setting 112. When the receptacle 122 is in position over the electrical interface setting 112, the guide block 104 moves away from the support 126 as the handle 102 is further motivated towards the guide block 104. As a result, the fluidics interface block 108 and the fluidics interface 170 supported by the fluidics interface block 108 engages a flow cell component within the electronic interface setting 112, guiding electrical interfaces of the flow cell component into the contact with an electronic interface of the electronic interface setting 112 and guiding the fluidics interface into contact with flow ports of the flow cell component. An electronic connection is made between the flow cell component and the electrical interface setting 112 in the closed position. At an intermediate engage position, the flow cell component is positioned adjacent the electronic interface setting 112 before the fluidics interface engages and moves the flow cell component into close contact with the electronic interface.

As illustrated in FIG. 2, the vertical clamp device 100 further includes flow cell component interface electronics 114 in electronic communication with the electrical interface setting 112 and further includes an electronic interface 116, such as an interface ribbon, that connects the vertical clamp device 100 with external electronic components.

As illustrated in FIGS. 1-8, the vertical clamping device 100 can further include a rack 128 to secure the vertical clamp device 100 to external supports. The rack 128 can further be connected to the support 126, providing a secure mounting for the vertical clamp device 100.

Figure 18:
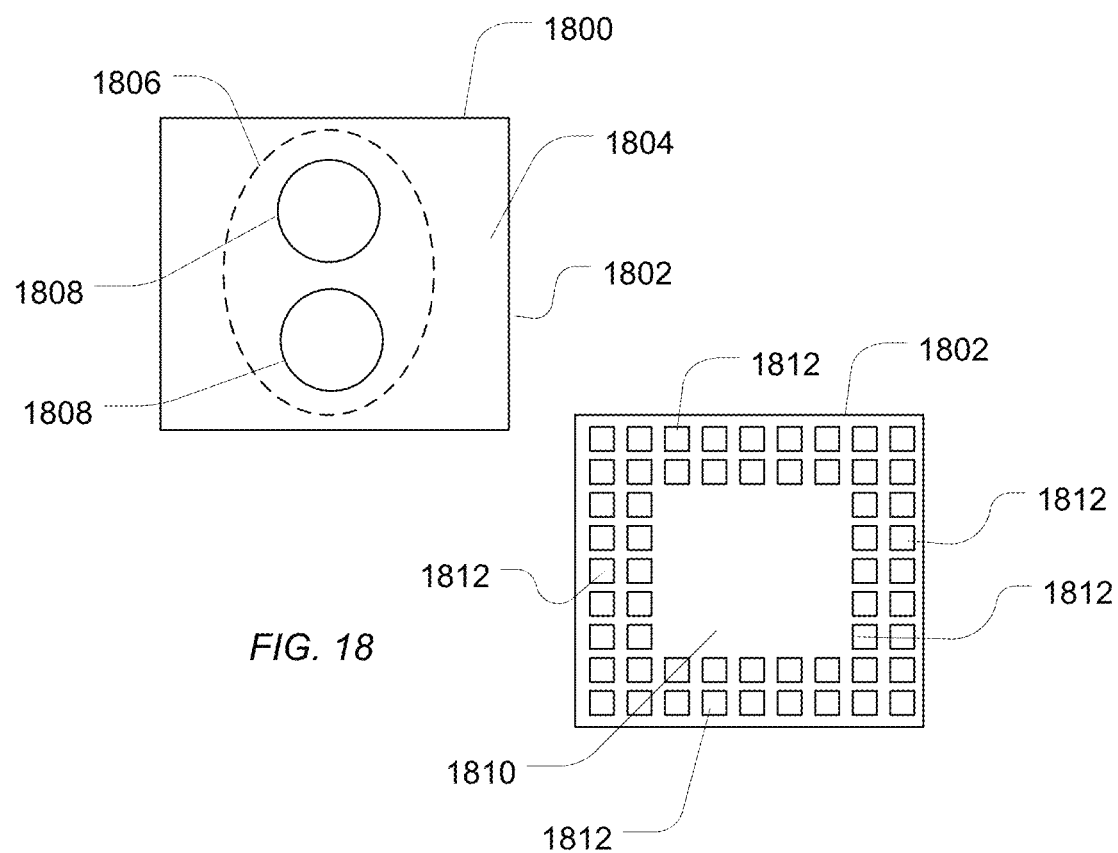
FIG. 18 includes an illustration of an exemplary flow cell component.

Referring to FIG. 2 and FIG. 8, the flow cell component can be inserted into the receptacle 122 of the carriage 110. In a particular example, a window 124 can be formed within the carriage to allow interaction with flow ports of the flow cell component. An exemplary flow cell component is illustrated in FIG. 18. For example, the flow cell component 1800 includes an electronic component 1802 and a lid or cap 1804 forming a flow cell 1806 over the electronic component 1802. In a particular example, the electronic component 1802 can be an array of sensors. Inlet and outlet ports 1808 are provided to interface with the flow cell 1806. Fluid can be directed to one port 1808 and removed from a different flow port 1808. In the example illustrated in FIG. 18, the electronic component 1802 can include interface pads 1812 distributed around a central area 1810 free from interface pads. The interface pads 1812 are on a side of the electronic component 1802 opposite the flow cell 1806.

Returning to FIG. 2, the flow cell component can be inserted into the receptacle 122 and the ports of the flow cell component can be accessed through the window 124. When the carriage 110 is permitted to move over the electrical interface setting 112 at the engage position and the flow cell component is motivated against the electronic interface of the electrical interface setting 112, for example, at the closed position, the interface patterns of the flow cell component interact with interface patterns or pogo pins of the electrical interface setting 112.

When engaged, the fluidics interface block 108 motivates the fluidics interface 170 into contact with the ports of the flow cell component through the window 124 and provides further force against the flow cell component to further provide for the electronic connection between the flow cell component and the electrical interface setting 112.

The vertical clamping device 100 can include various covers to protect components of the vertical clamp device and provide aesthetic features. FIGS. 9-17 include illustrations of the vertical clamping device mechanism illustrated without covers, such as a cover 130, and without the central support 126.

Figure 9:
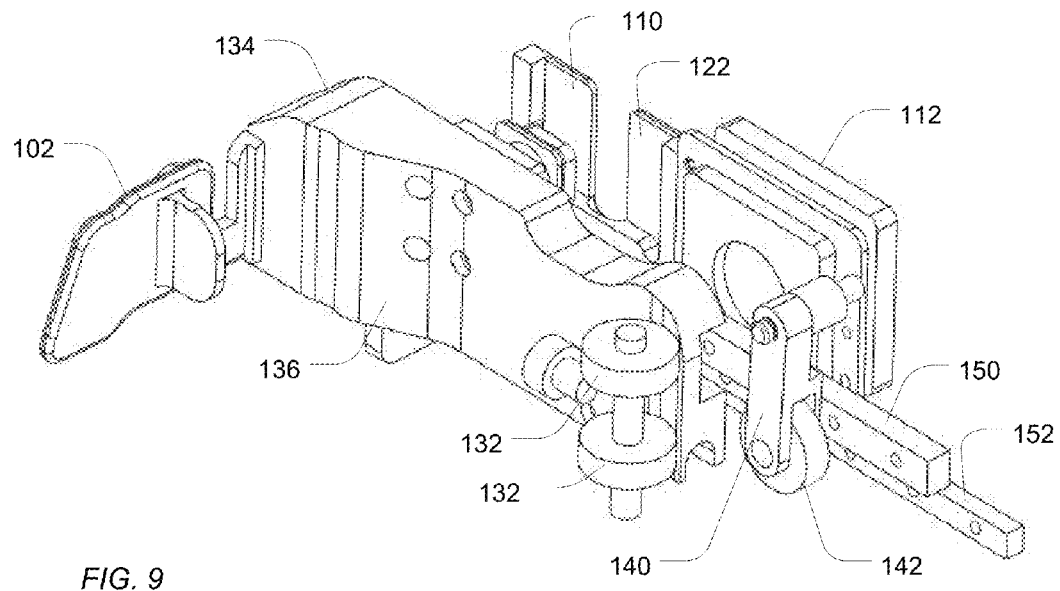
FIG. 9, FIG. 10, and FIG. 11 include isometric illustrations of an exemplary clamping mechanism.
Figure 10:
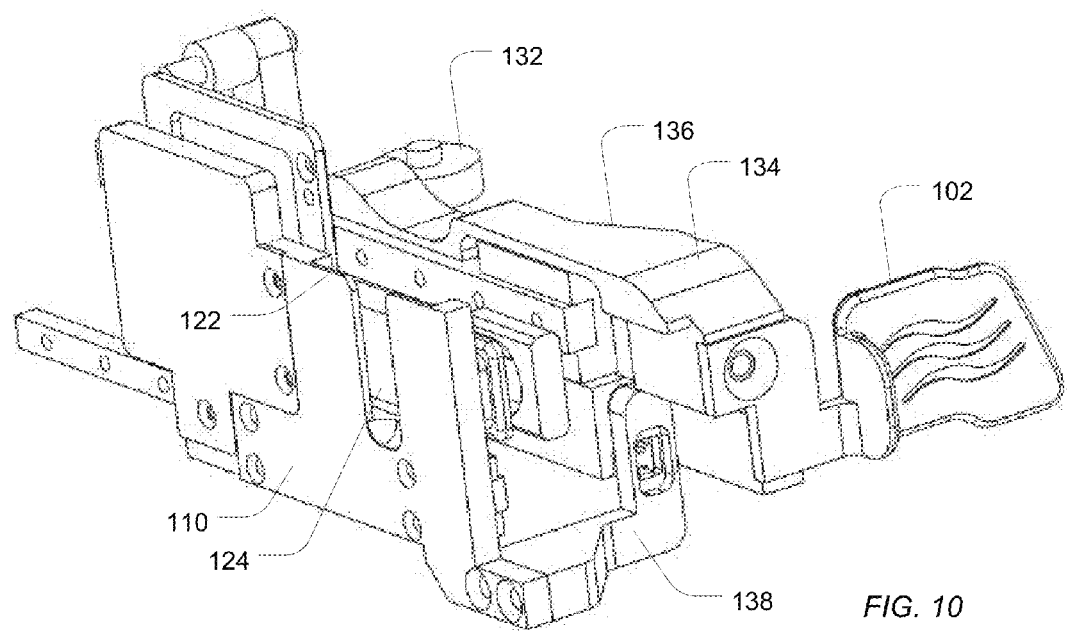
Figure 11:
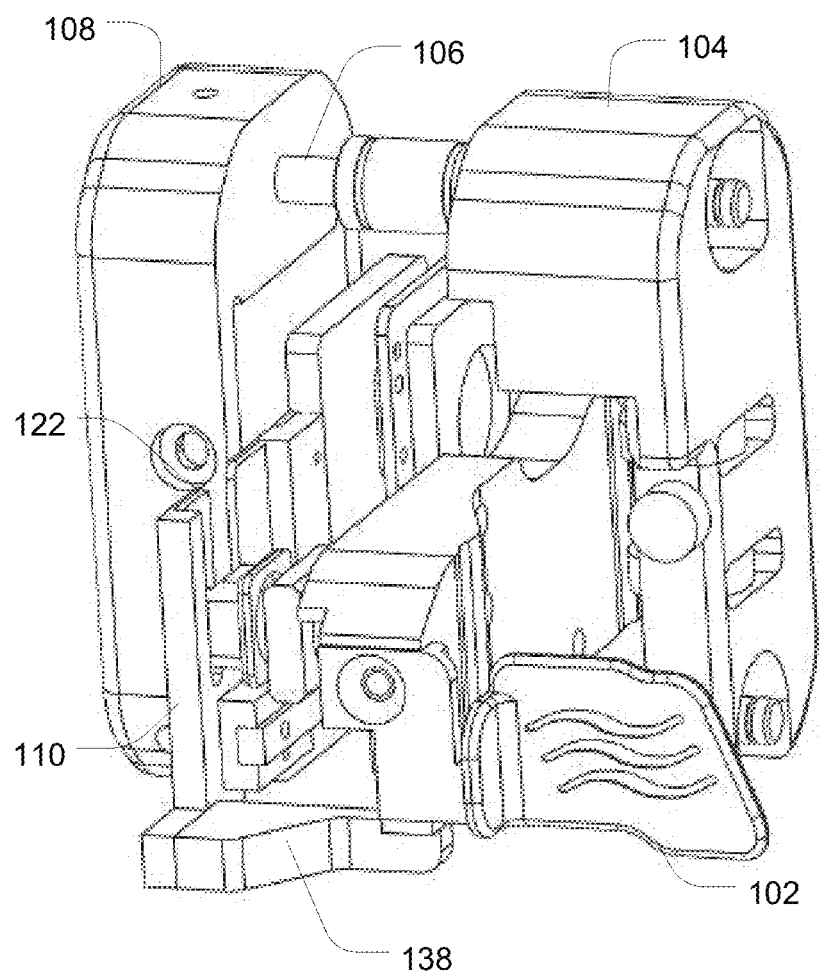

As illustrated in FIG. 9, the handle 102 is coupled to a drive component 134 that includes a ramp structure 136. In particular, the drive component or slide 134 can slide along a rail 150 secured to the central support 126. Referring to FIG. 10, the carriage 110 includes an arm 138 that engages the drive component or slide 134. In particular, the arm 138 can releasably engage the drive component or slide 134. The carriage can also slide or translate along a rail. The rails can be parallel, and the drive component and the carriage can translate along parallel paths.

As illustrated in FIG. 10, the carriage 110 is in an open position in which the receptacle 122 is away from electrical interface setting 112. When in the illustrated position, a force is applied to the carriage 110, motivating the carriage 110 toward the setting 112. The force can be applied by a motivator, such as a spring, elastomeric component, piston, other motivating devices, or any combination thereof to either push or pull the carriage 110 towards the setting 112. The drive component or slide 134 engages the arm 138, preventing the carriage 110 from moving towards the setting 112 when the handle 102 is in the illustrated position.

When the handle 102 is moved towards the guide block 104, the force applied to the carriage 110 moves the carriage 110 and in particular, the receptacle 122 towards the setting 112. The carriage 110 can slide along the rail 152 engaged with the central support 126. In an example, when the receptacle 112 is disposed over the interface setting 112 (e.g., at the engage position), the arm 138 of the carriage 110 disengages from the slide 134, allowing the flow cell within the receptacle 122 to remain over the setting 112.

As the handle 102 is moved towards the guide block 104, the ramp 136 engages the guide block 104, motivating the guide block 104 away from a central support 126. In particular, the guide block 104 may include slide wheels 132 secured to the guide block 104 and engaging the slide 134. As the ramp 136 contacts and moves between the slide wheels 132 and the support 126, the guide block 104 is motivated away from the central support 126, drawing the fluidics interface block 108 toward the receptacle 122 disposed over the electronic interface setting 112.

In an open position, the guide block 104 is motivated in a direction toward the support 126, for example by another motivator. As a result, the rods 106 can provide a relative positioning of the fluidics interface block 108 away from the support 126. When the ramp 136 engages the slide wheels 132 and the guide block 104, the ramp motivates the guide block 104 away from the support 126 and against any countering force, drawing the fluidics interface block 108 towards the electrical interface setting 112. The guide block 104, the fluidics interface block 108, the rods 106, or any combination thereof can be motivated by a force applied by a motivator, such as a spring, a piston, an elastomeric component, other motivators, or any combination thereof.

Figure 14:
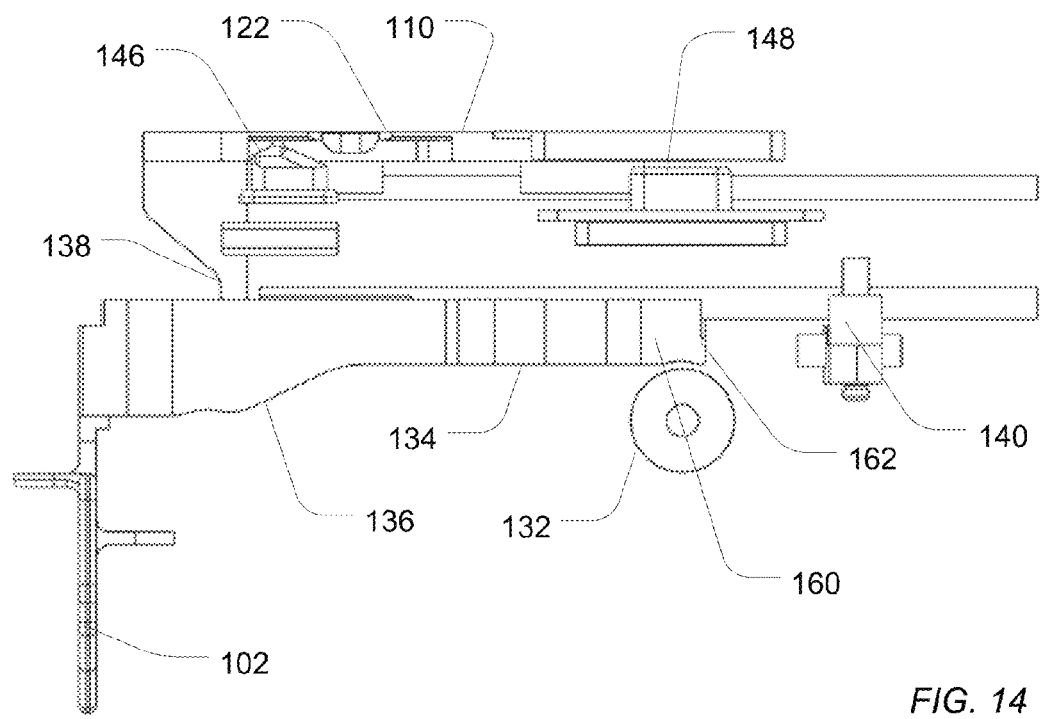
FIG. 14 includes a top view illustration of an exemplary vertical clamping mechanism.
Figure 15:
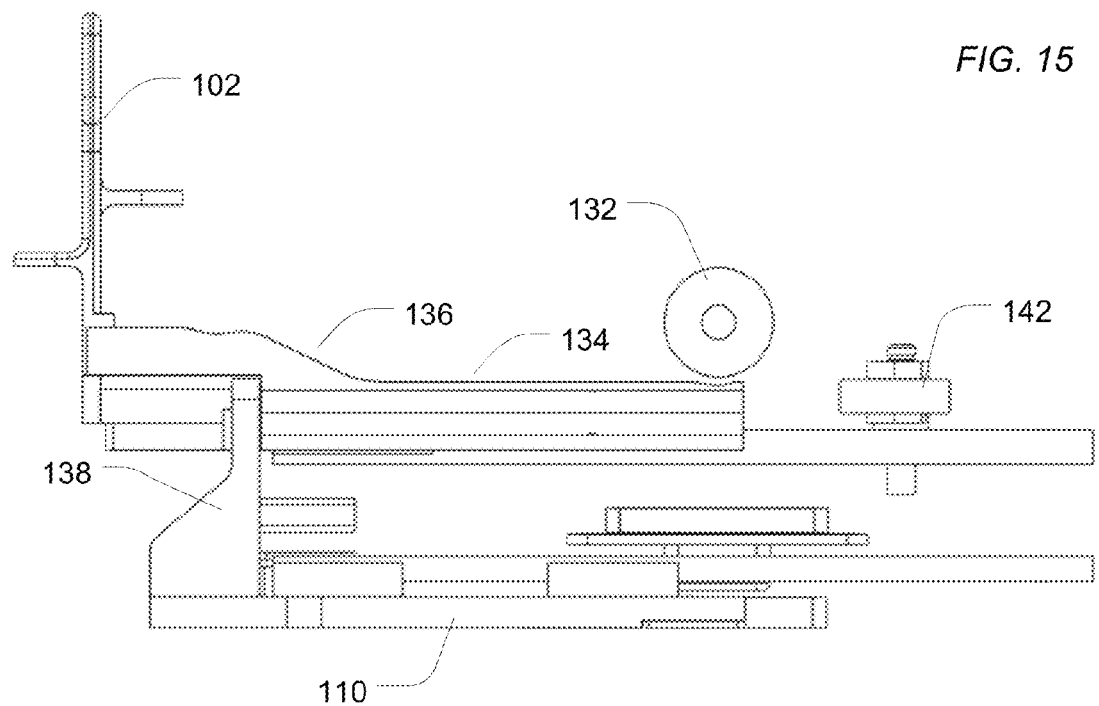
FIG. 15 includes a bottom view illustration of an exemplary vertical clamping mechanism.
Figure 16:
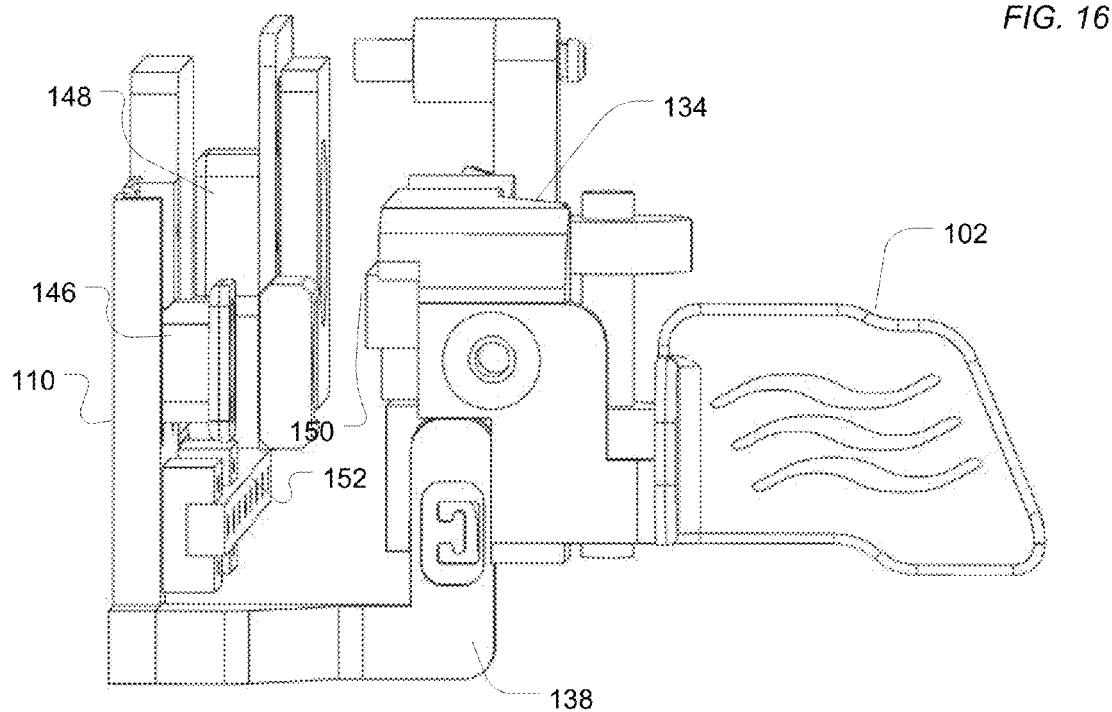
FIG. 16 and FIG. 17 include side view illustrations of an exemplary vertical clamping mechanism.
Figure 17:
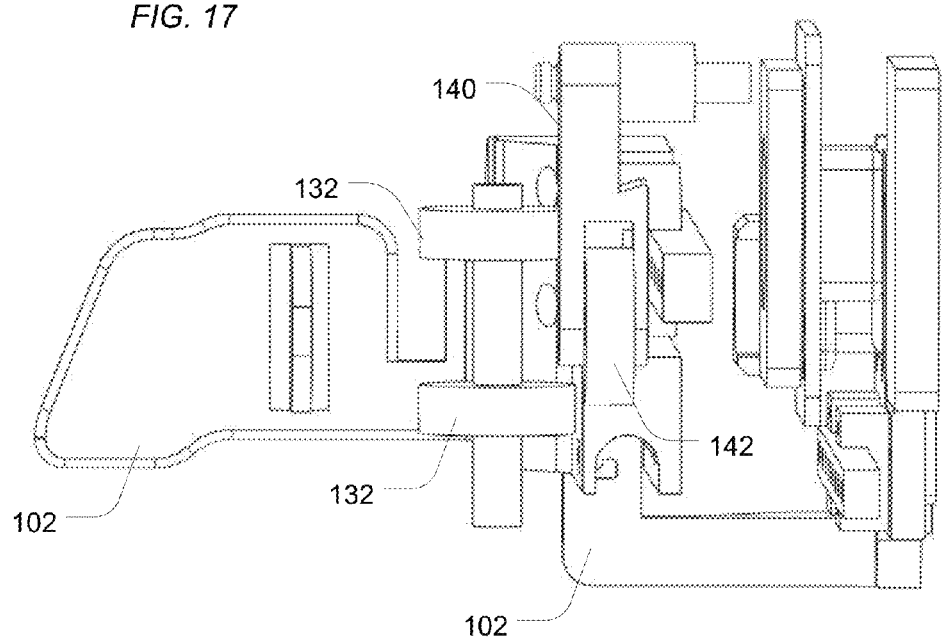

Referring to FIG. 14, a receptacle guide 146 can be disposed within the receptacle 122. In an example, the receptacle guide 146 moves toward the central support when a flow cell component is inserted into the receptacle 122. Optionally, the receptacle guide 146 prevents the device from being moved to a close position when the receptacle is free of a flow cell component. In another example, the receptacle guide 146 can be angled to assist with insertion and removal of the flow cell component. For example, the receptacle guide can push the flow cell component partially out of the receptacle 122, once the carriage is moved to the open position. In another example, the shape of the flow cell component can be adapted to fit with the receptacle guide 146 to prevent improper placement of the flow cell component in the receptacle 122.

In addition, the electronic interface setting 112 can include a setting guide 148. When the flow cell component is positioned over the electronic interface setting 112, the central portion of the electronic component free of interface pads can engage the setting guide 148. As the flow cell component is motivated into contact with electrical interface setting 112, the setting guide 148 can slide toward the central support 126. When the fluidics interface is released, the settings guide 148 can push the flow cell component into the receptacle 122, disengaging the flow cell component from the electronic interface setting 112 and positioning the flow cell component in the receptacle 122 of the carriage 110. In such a manner, the flow cell component can be moved to the open position and the receptacle guide 146 can be engaged to assist with pushing the flow cell component out of the receptacle 122. The electronic interface can also include pogo pins that move in response to contact with the flow cell component.

Figure 12:
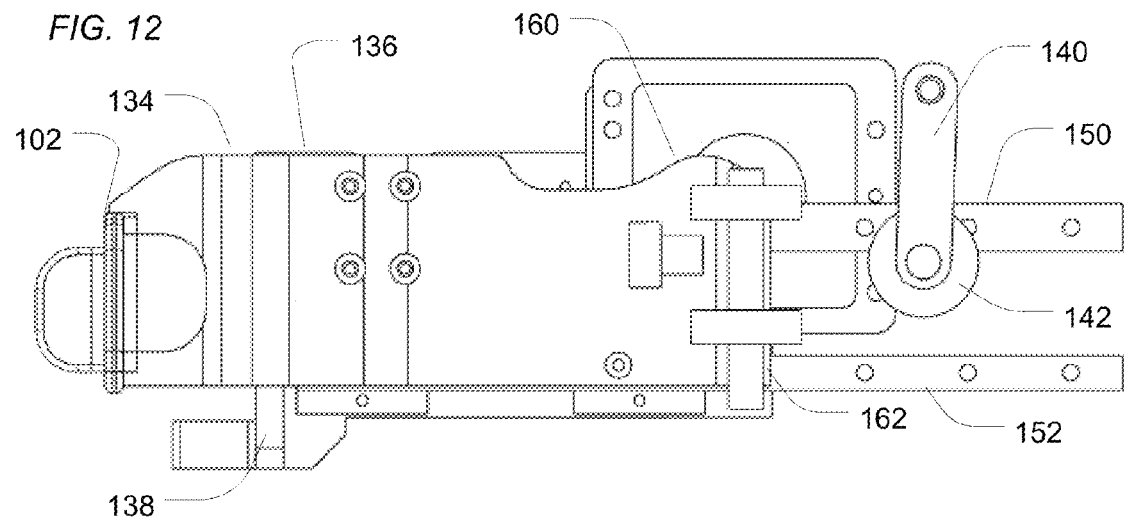
FIG. 12 and FIG. 13 include side view illustrations of an exemplary clamping mechanism.
Figure 13:
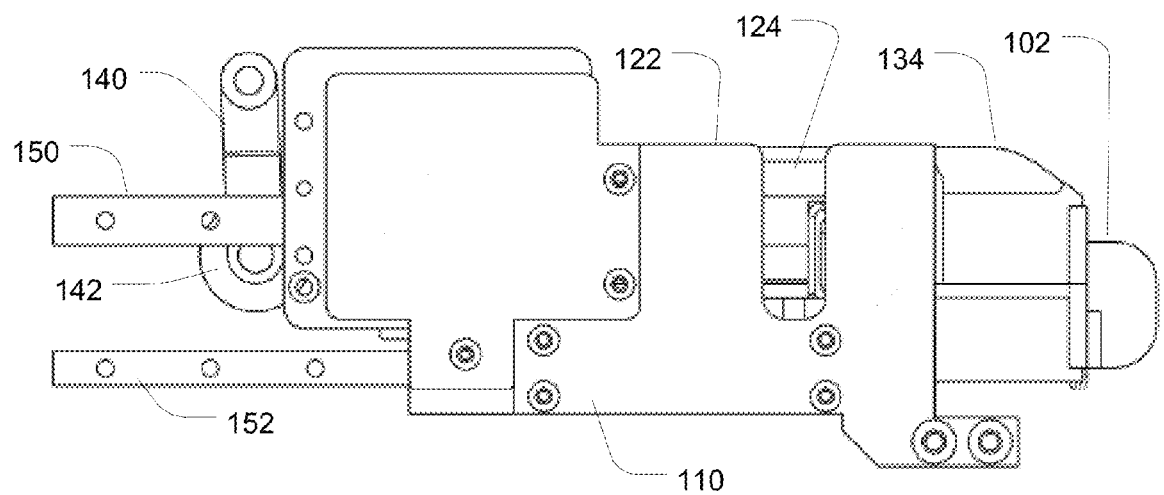

The system can further include a counter force arm 140 coupled to a counter force wheel 114 to engage the slide 134 as it motivates the guide block 104 into the close position. Referring to FIG. 12, the drive component or slide 134 includes a rounded corner 160. As the drive component or slide 134 moves to a closed position, the edge 162 of the slide 134 engages the wheel 142 of the counter force arm 140. The counter force arm 140 can be connected to rotational motivator, such as springs, elastomeric components, or other devices to provide rotational force. When the wheel 142 engages the slide 134, the arm 140 and wheel 142 provide a counter force opposite the force provided to the carriage 110. In a particular example, when the handle 102 is moved to guide the drive component or slide 134 toward the illustrated open position, the counter force arm 140 can provide additional force at the point at which the carriage 110 is engaged by the slide 134 to draw the receptacle 122 away from the electronic interface setting 112. Such a counter force arm 140 and wheel 142 can smooth the transition of the mechanism as a user moves the device between an open and closed position and vice versa. The system can also include a lever to lock the drive component into the open position or the closed position.

In a first aspect, a clamp device includes a carriage including a vertical receptacle to receive a flow cell component and having an arm, the carriage translatable between an insert position and an engage position. The clamp device further includes a motivator to apply force to the carriage in the direction of the engaged position away from the insert position; a fluidics interface block including a fluidics interface to engage flow ports of the flow cell component; and a drive component including a ramp structure and translatable between the insert position and a closed position. The drive component is to releasably engage the arm of the carriage when the carriage is positioned between the insert position and the engage position. The ramp structure is to interact with the fluidics interface block to motivate the fluidics interface into contact with the flow ports of the flow cell component when the drive component is in the closed position.

In an example of the first aspect, the engage position is between the insert position and the closed position.

In another example of the first aspect and the above examples, the drive component and the carriage translate along parallel paths.

In a further example of the first aspect and the above examples, the clamp device further includes a second motivator to apply force to the fluidics interface block in a direction away from the carriage.

In another example of the first aspect and the above examples, the clamp device includes a first rail along which the carriage is translatable. In an additional example, the clamp device further includes a second rail along which the drive component is translatable.

In a further example of the first aspect and the above examples, the clamp device further includes a handle coupled to the drive component.

In an additional example of the first aspect and the above examples, the clamp device includes a support block comprising an electronic interface to electronically interface with the flow cell component. For example, the electronic interface includes pogo pins. In another example, the clamp device further includes a setting guide associated with the electronic interface to provide force to the flow cell component in a direction away from the electronic interface. In a further example, the electronic interface is disposed opposite the fluidics interface block relative to the carriage. In an additional example, the support is disposed between the carriage and the drive component.

In another example of the first aspect and the above examples, the fluidics interface includes outlets to engage ports of the flow cell component.

In a further example of the first aspect and the above examples, the fluidics interface motivates the flow cell component against an electronic interface when the drive component is in the closed position.

In an additional example of the first aspect and the above examples, the clamp device further includes a translatable receptacle guide to engage the carriage when the carriage is in the insert position. For example, the receptacle guide is to disengage the carriage in response to receiving the flow cell component.

In a further example of the first aspect and the above examples, the clamp device further includes a counter force motivator to provide force to the drive component in a direction opposite the motivator. In an example the counter force motivator includes an arm and a rotational motivator.

In another example of the first aspect and the above examples, the flow cell component includes a substrate, a cap disposed over the substrate and defining the flow ports, and an electronic interface disposed on an opposite side of the substrate from the cap.

In a further example of the first aspect and the above examples, the vertical receptacle includes a window providing access to the flow ports of the flow cell component.

In an additional example of the first aspect and the above examples, the clamp device further includes a guide block connected to the fluidics interface block by at least one rod, the guide block to engage the ramp to move the guide block and the connected fluidics interface block.

In a second aspect, a method of engaging a flow cell component includes inserting the flow cell component into a vertical receptacle of a carriage of a clamp device. The clamp device includes the carriage including the vertical receptacle to receive the flow cell component and having an arm, the carriage translatable between an insert position and an engage position; a motivator to apply force to the carriage in the direction of the engaged position away from the insert position; a fluidics interface block including a fluidics interface to engage flow ports of the flow cell component; and a drive component including a ramp structure and translatable between the insert position and a closed position, the drive component to releasably engage the arm of the carriage when the carriage is positioned between the insert position and the engage position, the ramp structure to interact with the fluidics interface block to motivate the fluidics interface into contact with the flow ports of the flow cell component when the drive component is in the closed position. The method further includes moving the drive component past the engage position and to the closed position.

Examples of the second aspect can further be implemented using the device of the first aspect and related examples.

Note that not all of the activities described above in the general description or the examples are required, that a portion of a specific activity may not be required, and that one or more further activities may be performed in addition to those described. Still further, the order in which activities are listed are not necessarily the order in which they are performed.

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" are employed to describe elements and components described herein. This is done merely for convenience and to give a general sense of the scope of the invention. This description should be read to include one or at least one and the singular also includes the plural unless it is obvious that it is meant otherwise.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

After reading the specification, skilled artisans will appreciate that certain features are, for clarity, described herein in the context of separate embodiments, may also be provided in combination in a single embodiment. Conversely, various features that are, for brevity, described in the context of a single embodiment, may also be provided separately or in any subcombination. Further, references to values stated in ranges include each and every value within that range.

I claim:

1. A clamp device comprising:
   a carriage including a vertical receptacle to receive a flow cell component and having an arm, the carriage translatable between an insert position and a closed position;
   a translatable receptacle guide to engage the carriage when the carriage is in the insert position;
   a fluidics interface block including a fluidics interface to engage flow ports of the flow cell component;
   an electronic interface setting to engage electronic pads of the flow cell; and
   a drive component translatable between the insert position and the closed position, the fluidics interface block to motivate the fluidics interface into contact with the flow ports of the flow cell component and the electronic interface to engage the electronic pads of the flow cell component when the drive component is in the closed position.

2. The clamp device of claim 1, wherein the drive component and the carriage translate along parallel paths.

3. The clamp device of claim 1, further comprising a motivator to apply force to the carriage in the direction of the closed position away from the insert position.

4. The clamp device of claim 3, further comprising a second motivator to apply force to the fluidics interface block in a direction away from the carriage.

5. The clamp device of claim 1, further comprising a first rail along which the carriage is translatable.

6. The clamp device of claim 5, further comprising a second rail along which the drive component is translatable.

7. The clamp device of claim 1, further comprising a handle coupled to the drive component.

8. The clamp device of claim 1, wherein the electronic interface includes pogo pins.

9. The clamp device of claim 1, wherein the electronic interface is disposed opposite the fluidics interface block relative to the carriage.

10. The clamp device of claim 1, wherein the fluidics interface includes outlets to engage ports of the flow cell component.

11. The clamp device of claim 1, wherein the fluidics interface motivates the flow cell component against the electronic interface when the drive component is in the closed position.

12. The clamp device of claim 1, wherein the receptacle guide is to disengage the carriage in response to receiving the flow cell component.

13. The clamp device of claim 1, further comprising a counter force motivator to provide force to the drive component in a direction opposite the motivator.

14. The clamp device of claim 13, wherein the counter force motivator includes an arm and a rotational motivator.

15. The clamp device of claim 1, wherein the flow cell component includes a substrate, a cap disposed over the substrate and defining the flow ports, and the electronic pads disposed on an opposite side of the substrate from the cap.

16. The clamp device of claim 1, wherein the vertical receptacle includes a window providing access to the flow ports of the flow cell component.

17. The clamp device of claim 1, further comprising a guide block connected to the fluidics interface block by at least one rod, the guide block to engage a ramp of the drive component to move the guide block and the connected fluidics interface block.

18. A method of engaging a flow cell component, the method comprising:
   inserting the flow cell component into a vertical receptacle of a carriage of a clamp device when a drive component of the clamp device is in the insert position, the clamp device comprising:
      the carriage including a vertical receptacle to receive a flow cell component and having an arm, the carriage translatable between an insert position and a closed position;
      a translatable receptacle guide to engage the carriage when the carriage is in the insert position;
      a fluidics interface block including a fluidics interface to engage flow ports of the flow cell component;
      an electronic interface setting to engage electronic pads of the flow cell; and
      a drive component translatable between the insert position and the closed position, the fluidics interface block to motivate the fluidics interface into contact with the flow ports of the flow cell component and the electronic interface to engage the electronic pads of the flow cell component when the drive component is in the closed position;
   moving the drive component to the closed position, the flow cell component engaged between the fluidics interface and the electronic interface, a setting guide compressed when moving the drive component to the closed position.

19. The method of claim 18, further comprising moving the drive component from the closed position, the setting guide pushing the flow cell component away from the electronic interface and into the vertical receptacle.

20. The method of claim 18, wherein the receptacle guide disengages the carriage in response to inserting the flow cell component.

* * * * *